United States Patent
Holman et al.

(10) Patent No.: US 8,298,813 B2
(45) Date of Patent: Oct. 30, 2012

(54) METHOD FOR PREPARING AN EXPANDED PRODUCT FOR FERMENTATION

(76) Inventors: Dennis Holman, Heveadorp (NL); Henk Schuurman, Nijmegen (NL)

( * ) Notice: Subject to any disclaimer, the term of this patent is extended or adjusted under 35 U.S.C. 154(b) by 1120 days.

(21) Appl. No.: 11/663,566

(22) PCT Filed: Sep. 23, 2005

(86) PCT No.: PCT/EP2005/054791
§ 371 (c)(1),
(2), (4) Date: Dec. 28, 2007

(87) PCT Pub. No.: WO2006/032701
PCT Pub. Date: Mar. 30, 2006

(65) Prior Publication Data
US 2008/0213866 A1    Sep. 4, 2008

(30) Foreign Application Priority Data

Sep. 23, 2004   (EP) .................................... 04104623

(51) Int. Cl.
*C12N 1/14* (2006.01)
*C12M 1/16* (2006.01)
*A61L 2/07* (2006.01)

(52) U.S. Cl. ................... 435/256.8; 435/307.1; 422/26

(58) Field of Classification Search ............... 435/256.8, 435/307.1; 422/26
See application file for complete search history.

(56) References Cited

U.S. PATENT DOCUMENTS

| | | | | |
|---|---|---|---|---|
| 3,357,895 A | * | 12/1967 | Cherry | 435/242 |
| 3,660,110 A | | 5/1972 | Holtz, Jr. et al. | 99/81 |
| 3,661,071 A | | 5/1972 | Toei et al. | 99/238 R |
| 4,915,606 A | | 4/1990 | Shimokawa et al. | 422/295 |
| 4,922,650 A | * | 5/1990 | Akao et al. | 47/1.1 |
| 5,230,430 A | * | 7/1993 | Kidder | 206/484.1 |
| 2003/0099568 A1 | | 5/2003 | Vandenhove | 422/1 |

FOREIGN PATENT DOCUMENTS

| DE | 198 58 979 1 | 6/2000 |
|---|---|---|
| FR | 2 731 437 A | 9/1996 |

\* cited by examiner

*Primary Examiner* — Roseanne Kosson
(74) *Attorney, Agent, or Firm* — Westman, Champlin & Kelly, P.A.; Z. Peter Sawicki

(57) ABSTRACT

The invention pertains to a method for preparing a product for fermentation comprising the steps:
i. sterilizing and expanding a substrate to obtain a sterile expanded substrate,
ii. cooling and inoculating the sterile expanded substrate by contacting the sterile expanded substrate with a cooling medium and an inoculum to obtain a cooled inoculated substrate.

The expansion step can be performed using techniques from the state of the art known as popping or puffing.
The method can be performed in standard equipment and is very flexible in its use. Furthermore, the method allows reducing the time and energy necessary to obtain a product for fermentation, such as solid state fermentation.

17 Claims, 1 Drawing Sheet

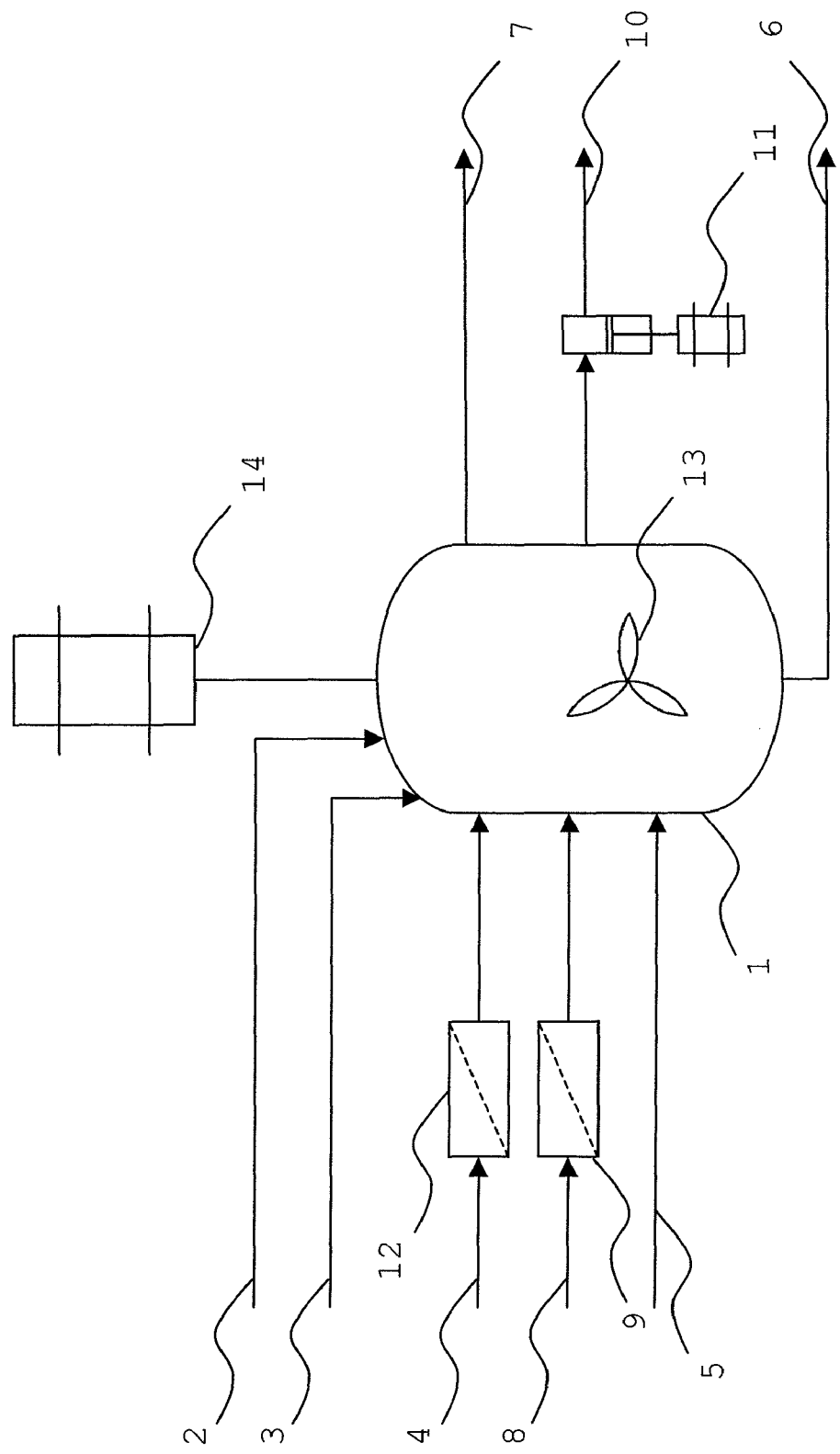

_US 8,298,813 B2_

METHOD FOR PREPARING AN EXPANDED PRODUCT FOR FERMENTATION

CROSS-REFERENCE TO RELATED APPLICATION

This Application is a Section 371 National Stage Application of International Application No. PCT/EP2005/054791, filed Sep. 23, 2005 and published as WO 2006/032701 A1 on Mar. 30, 2006.

FIELD OF THE INVENTION

The present invention relates to a method for preparing a product for fermentation.

BACKGROUND ART

In fermentation processes, micro-organisms can be cultivated for instance on moist solid raw materials, such as straw, soy and grains. Such solid raw material, herein further called the substrate, often contains various bacteria and microorganisms that will compete with the micro-organisms to be cultivated and therefore reduce production efficiency.

Hence, the substrate must be disinfected, before it is inoculated with inoculum, in order to avoid contamination by competitor micro-organisms such as other fungi or bacteria. The disinfection of substrates is usually carried out by heating the substrate. Subsequently, the disinfected substrate is cooled to prevent the inoculum from degrading. Such method is described in U.S. Pat. No. 4,922,650. Herein a method is disclosed for continuous manufacturing a substrate for cultivating mushrooms. The substrate is heated and sterilized using saturated steam. Subsequently, the substrate is cooled and spawned. The cooling is performed by scattering water over the solid sterilized substrate using a sprinkler installation. The scattered water does not immediately reach the core of the substrate, making it difficult to regulate the cooling step. Therefore an extra water jacket is used in combination with the sprinkler installation to either heat or cool the sterilized substrate. The procedure is time and energy consuming. Furthermore an installation needed for such a method is complicated, especially since the sterilized substrate must be kept sterile after sterilization. To avoid infections, costly down time of the installation is necessary. FR 2 731 437 discloses a device wherein an gas-dispersed Basidiomycete substrate is heat-sterilised in a heating unit, cooled by a flow of cold air in a cooling vessel and subsequently mixed with inoculum in a mixing device. The condition of gas-dispersion allows a fast and uniform heat-sterilisation, preventing the formation of formic acid in the substrate, as well as an effective cooling. However, FR 2 731 437 does neither disclose nor suggest expansion of the substrate, nor does the heat-sterilisation of the disclosed substrate inherently produce an expanded product.

SUMMARY OF THE INVENTION

The objective of the present invention is to obtain a method, which allows a time- and energy-efficient, instantaneous cooling of a substrate to a desired temperature, which allows homogeneous inoculating the substrate with a suitable microorganism, which allows obtaining a homogeneous inoculated product that is suitable for fermentation, and which allows performing with standard equipment.

To attain this objective, the invention provides in a first aspect a method for preparing a product for fermentation comprising the steps: i. sterilizing and expanding a substrate to obtain a sterile expanded substrate, ii. cooling and inoculating the sterile expanded substrate by contacting the sterile expanded substrate with a cooling medium and an inoculum to obtain a cooled inoculated substrate.

DESCRIPTION OF THE DRAWING

FIG. 1 Apparatus for expanding product.

DETAILED DESCRIPTION OF THE INVENTION

Expansion of a substrate will produce an expanded substrate with an increased volume and concomitantly a decreased bulk density. The bulk density (in $kg/m^3$) of the sterile expanded substrate typically may be from about 50% to about 10% of the bulk density of the unexpanded substrate, preferably about 40% or 30% or 20% to about 10%. Thus, the method of the invention has the advantage that the substrate is expanded to a porous structure whereby its volume and surface area is increased. This has a positive effect on the cooling efficiency. Furthermore, the expansion step may make the substrate more accessible for micro-organisms and may increase the chemical availability. Thereby, the substrate can be used more efficiently.

The expansion of the substrate is performed using state of the art techniques. The conventional method of expanding a substrate, such as cereal grains, rice, corn, and the like, is to charge the substrate into a closed pressure chamber and subject it to pressure and heat in the presence of an expansion medium, which condenses onto the substrate. By suddenly releasing pressure the substrate is expanded. Preferably, the substrate is expanded using steam as expansion medium. Suitable methods for expanding grains and the like are for example described in U.S. Pat. No. 2,698,799 and U.S. Pat. No. 3,660,110. Expansion of the substrate is also possible using microwaves. The expansion process is also known as popping or puffing. Sterilization implies the complete destruction of all micro-organisms including spores and can for instance be accomplished by subjecting the substrate to heat, chemicals or radiation. The sterilization of the substrate can be performed using state of the art techniques and procedures. In the present method, the substrate is preferably sterilized by heating with steam.

The use of steam for the sterilization of the substrate has the advantage that steam also gives pressure build up and provides heat for expanding the substrate. Therefore, in the method of the invention, the sterilization step and expansion step are preferably performed simultaneously. The simultaneous performance of these steps makes the process more energy-efficient and less time-consuming. In a preferred embodiment of the invention, a dry substrate is subjected to sterilization and expansion. By using a dry substrate less energy is necessary for the sterilization and expansion, because there is no water to be heated together with the substrate.

A positive side effect of the expansion step is that the sudden release of the pressure leads to a sharp drop of the temperature of the substrate due to the "flash" evaporation of condensed expansion medium. If the expansion step is performed to a flash-tank at sub-atmospheric pressure, the temperature of the expanded substrate can be lowered even more. This has the advantage that the temperature difference of the hot expanded and the cooled substrate is smaller, and the cooling step thus is easier and faster. Since the cooling medium can penetrate easily into the core of the porous expanded substrate, cooling of the expanded substrate is obtained instantaneously. Furthermore, the cooled substrate will have a homogeneous temperature. This easy penetration is especially achieved with water as the cooling medium.

The temperature of the cooled substrate can be set by changing the specific heat value of the substrate before contacting it with the cooling medium. This can be performed by changing its water content by drying using dry steam or by moistening the substrate before cooling.

The cooling medium as used in the cooling step is preferably water. Water has the advantage over other cooling media that it is not necessary to remove it from the cooled substrate. Preferably, the substrate is moistened during cooling by the water that is used as the cooling medium. The substrate has preferably a humidity of 40 to 80 wt %, which is advantageous for inoculation and fermentation. Furthermore, water has a relatively high specific heat capacity in comparison with the expanded substrate, which makes it an excellent cooling medium. Due to the difference in specific heat value between the expanded substrate and the cooling water, the temperature of cooling water can be chosen such that the cooled substrate has a temperature and humidity, which are suitable for fermentation, without the need for a further separate cooling step.

To obtain cooled substrate having a temperature suitable for inoculation, the cooling water preferably has a temperature below 40[deg.] C., more preferably below 20[deg.] C., and even more preferably below 10[deg.] C. In practice, a water temperature of about 0.5 to 4[deg.] C. appears very suitable for efficient cooling.

Preferably, the water contains auxiliary agents. Such auxiliary agents are for example acids, bases, sugars, precursors for a desired final fermentation-product, or thermolabile agents, such as vitamins and antibiotics. These auxiliary agents are used to improve the fermentation conditions for the micro-organism or for the objective of the fermentation, such as yielding specific metabolic compounds. Since the temperature of the cooling water is lower than the fermentation temperature, thermolabile agents can also be used as an auxiliary agent in the cooling water.

Another advantage of expanding the substrate is that the interior of the substrate can easily be inoculated, since the inoculum can also easily penetrate into the porous structure of the expanded substrate.

This easy penetration of the inoculum especially occurs when the cooling medium is water and cooling and inoculation are performed simultaneously. Simultaneous cooling and inoculation precludes the necessity to mix the cooled wetted substrate with the inoculum by extensive stifling and ensures a more homogeneous inoculation of the substrate.

Therefore, in a preferred embodiment of the invention, the contacting of the sterile expanded substrate with the cooling water and the inoculum is performed simultaneously. More preferably, the inoculum is contained in the cooling water.

In a further preferred embodiment, the sterile expanded substrate is transferred, when still being hot, from the sterilization and/or expansion vessel to a separate vessel or disposable bag, e.g. a vessel or bag suitable for solid state fermentation. Cooling water containing the inoculum then is added to the vessel or bag allowing agitation by gently shaking or vibrating. In this way, the expanded substrate is not damaged due to extensive stifling and the sterilization and/or expansion vessel is kept clean and dry and ready for receiving the next expansion batch.

When a thermo-labile micro-organism is used as inoculum, the inoculation must be performed at a low temperature to avoid degradation of the micro-organism, especially when cooling and inoculation are simultaneously performed. However, it is also possible that the sterile expanded substrate is first cooled and then inoculated. Hereby, contact between the hot surface of the sterile expanded substrate and the thermolabile micro-organisms is minimized.

The inoculum may conveniently be in the form of an aqueous suspension. The aqueous phase may be the culture medium of the microorganism, a suitable buffer, a (buffered) physiological salt solution, water, and the like. Preferably, the cooled substrate is used as such in the inoculation step without any further treatment such as heating and cooling. This further decreases the chance of infecting the sterilized cooled substrate. Moreover, the process time is reduced. If it is desired to perform the inoculation step later, any one of the substrate, the sterile expanded substrate and the cooled substrate can be dried with dry steam. When spores are used as inoculum, the inoculated substrate is preferably incubated before used in a fermentation process. Therefore, an incubation step may be performed after step ii. Hereby the inoculum spores are allowed to develop to viable colonies, allowing the inoculated substrate to be used in a fermentation process.

The product of the previously mentioned methods can be used as such in a fermentation process, such as solid state fermentation, either immediately after inoculating the substrate or after incubating the inoculated substrate.

Due to the fact that simple standard equipment can be used with the present invention, the method is easy to handle and extra steps are easily incorporated in the method.

Prior art processes for preparing a product for fermentation are quite limited in their flexibility. With these processes, it is not possible to choose the properties of the product, such as the final temperature of the substrate, the degree of sterilization and the water content, independently. It is now found that the desired product properties can be chosen independently from each other by performing the method of the present invention in an installation wherein at least the substrate is introduced via a separate process stream. Preferably, the substrate, cooling medium, and inoculum are introduced via separate process streams. In Korean patent application KR 9702164 (abstract), inoculated expanded rice is described for use in the production of rice vinegar. This reference does not disclose the methods of this invention.

Substrates, which can be used in present invention, are preferably fermentable materials that are permeable to steam. Examples are: grain such as rye, wheat and rice; tuberous plant parts, such as potatoes, sugar beets and cassava; cellulose- or lignin-rich products, such as straw, wood, cocoa pod husks; —soy beans; legume, such as chickpeas; waste material of treatments of the above substrates, such as sugar beet-pulp, soy meal;

The substrate can optionally be pre-treated before being subjected to sterilization for example by: a chemical treatment, such as treatment with acids or bases, or treatment with formaldehyde; a fermentation treatment; a radiation treatment; —mixing with auxiliary compounds such as pH stabilizers, drying; boiling in water; reducing or enlarging the particle size of the substrate.

Biological material used as inoculum in the present invention can contain cultures of more than one type of microorganisms or spores thereof. Also, genetically modified micro-organisms or virus-containing micro-organisms can be used. The preparation of the inoculum can be performed using methods known in the art. Usually the inoculum is prepared using a bioreactor. Examples of biological material are: bacteria; cyanobacteria; fungi; yeasts—algae; protozoa; cells of higher organisms such as human cells, cells of plants and cells of animals.

Preferably, fungi are used as inoculum, because these are ideally suited to colonize and penetrate solid particles. Fungi are very efficient enzyme producers, they can make aromas and health promoting substances of interest to the food industry, and they can act as natural antagonists to pests in agriculture. Examples are Aspergillus oryzae used in soy sauce production, —Rhizopus oligosporus used to make Tempeh, Penicillium roquefortii used to make Roquefort cheese, Agaricus bisporus and Pleurotus ostreatus used as edible mushrooms, and Coniothyrium minitans used as a biological pest control agent.

In a second aspect, the present invention discloses an inoculated substrate obtainable by the method of the first aspect.

The product obtainable by the method of the invention can be used in a wide variety of processes comprising a fermentation step, for example: production of Koji, which can be used in the production of e.g. soy sauce, miso, sake, tape, and sufu; production of (protein rich) animal or human foodstuff, such as single cell protein (SCP), and Tempeh; production of a substrate for mushrooms, such as Agaricus, Pleurotus, and Shiitake.

The product further can be used because of its biomass content:—as new inoculum material for subsequent use in other fermentations, such as spawn for the production of mushrooms such as Agaricus; as catalyst in immobilized cell reactors; as biological filter for purifying air or water; in the production of green energy.

The product further can be used because of its spores content:—sterilization indicator during sterilization processes, such as spores of $B.\ stearothermophilus$; active ingredients for biological (myco) pesticides, (myco) fungicides or (myco) insecticides such as spores of $B.\ thuringiensis$ and conidia of Beauveria; —inoculum for the fermentation of Penicillium.

The product further can be used in processes for the production of metabolites and chemicals:

(primary) metabolites, such as aceton, ethanol, butanol, amino acids, sugar derivatives, and citric acid; —(secondary) metabolites, such as flavonoids, fenols, alkaloids, hormones, vitamins, and lipids; feromones used to attract insects; antibiotics, such as streptomycin, penicillin, cephalosporin, and griseofulvin; —toxins, such as botulinum toxins used in warfare, in medicine (botox), or used as standards in standard analysis in the food industry; enzymes, such as hydrolases, phenylalaninedecarboxylases, and laccases; —chemicals produced by biotransformation of precursors; bio-degradable plastics, such as poly-hydroxybutyric acid; (di/oligo/poly) peptides and nucleotides; carbon dioxide; hydrogen; —ammonia or ammonium salts. The invention is illustrated in FIG. 1 and by the example. The embodiments of the FIGURE and the example are illustrative only, and should not be considered as limitative.

In FIG. 1, a vessel 1 is shown with supply conduits 2,3,4,5 for supplying respectively substrate, steam, a cooling medium, and inoculum, and with outlet conduits 6,7 for the product and steam, respectively. When desired other connections can be supplied to the vessel, for example as illustrated in FIG. 1, an air supply conduit 8 including a filter 9 and an air outlet conduit 10, including a vacuum pump 11.

For the preparation of a product for fermentation, preferably a dry substrate is supplied to vessel 1 via supply conduit 2. The substrate is subjected to a pressure of 10 bar using steam of a temperature of 180[deg.] C. supplied via supply conduit 3. The substrate is expanded by a sudden release of pressure by opening a valve towards the steam outlet 7. During this expansion process, the substrate is simultaneously sterilized with the present steam and the temperature of the substrate drops to about 100[deg.] C. This temperature can be reduced even further, if the pressure is reduced to a subatmospheric value.

The expanded sterile substrate is further cooled by supplying a cooling medium, preferably cold water with a predetermined temperature lower than 20[deg.] C., via supply conduit 4 to vessel 1. The temperature of the cooling water can be controlled for instance using a thermostat. Before being added to vessel 1, the cold water is passed through a filter 12 to sterilize the water. Instead of using filter 12 the water can also be subjected to UV, pulsed light or a pulsed electric field. The cold water, for instance containing auxiliary thermo-labile agents, reduces the temperature of the expanded substrate instantaneously to the desired fermentation temperature, often between 20 and 30[deg.] C. Due to the fact that the expansion has created a sort of porous structure the cooled expanded substrate particle has a homogeneous temperature distribution, because the cold water is able to penetrate into the core of the dry substrate particle. The inoculum, which is prepared simultaneous with the preparation of the cooled expanded substrate, is added via supply conduit 5. Again because of the porous structure of the expanded substrate particle, the inoculum is distributed homogeneously over the expanded substrate to obtain the product. The supply conduits (4,5) for cooling medium and inoculum, respectively, may advantageously be combined in one supply conduit to allow supply of cooling medium containing the inoculum.

Mixing during the process permits obtaining a homogeneous composition. This can be performed with a propeller 13 driven by an electro motor 14. However, mixing can also be performed by means of tumble-mixing, shaking or vibrating or by using the momentum of the different streams that enter or exit the vessel 1, like the cold water supply stream 4, the steam supply 3 and steam outlet 7.

EXAMPLE 1

A vessel was sterilized and then loaded with 30 kilograms of the raw material rye. Subsequently all air was removed from the loaded vessel by creating a vacuum.

Subsequently, steam was injected up to a pressure of 10 bar. By mixing, a homogeneous temperature was obtained in the vessel. The rye was kept at a temperature of 180[deg.] C. until it was sterile. Then steam was injected into the vessel up to a pressure of 14 bar. By mixing a homogeneous temperature was obtained.

The pressure was released by suddenly opening the steam outlet. The thus obtained rye was sterile and expanded having a temperature of about 100[deg.] C. and a specific heat that is about equal to the raw material.

The expanded rye was cooled to 30[deg.] C. by adding under mixing 39.6 kg of water of 0.5[deg.] C., which was sterilized with a filter. A liquid inoculum of the fungus Pleurotus ostreatus was added to the cooled moist rye.

The resulting sub-atmospheric pressure was elevated to atmospheric pressure with filter-sterilized air. Subsequently, the contents of the vessel are carefully mixed for 3 minutes. Inoculated expanded sterile rye was obtained with a water content of about 60 wt. %, which water content was predetermined and obtained by selecting the amount and temperature of the cooling water.

The inoculated rye was incubated at a temperature of 25[deg.] C. to obtain incubated rye, which was suitable for solid state fermentation.

EXAMPLE 2

A pressure vessel was loaded with 15 kg of the raw material wheat. All air was removed by simultaneously opening a steam valve and an exhaust valve for a short time. After removing the air, steam was injected up to a pressure of 10 bar. Mixing and homogeneous heating was performed by tangential injection of the steam and using its momentum to move the substrate. The wheat was kept at a pressure of 10 bar until sterility.

The pressure was suddenly released by opening the exhaust valve. The result was puffed sterile wheat with a volume enlargement of about 500% as compared to the original substrate. The puffed wheat at a temperature of about 100<0>C. was transferred to a presterilised solid state fermentation vessel by opening a valve on the bottom of the pressure vessel. A mixture of chilled water with a temperature of 11<0>C. and a liquid inoculum of the strain Agaricus brunescens was added. Simultaneously, the vessel was gently agitated by means of a pneumatic vibrator. After one minute, most of the free water was absorbed.

Inoculated expanded wheat with a temperature of 28<0>C. and a water content of 70 wt % was obtained, which is suitable for solid state fermentation.

It will of course be understood that many variations may be made to the above-described embodiment without departing from the scope of the present invention. Although the present invention has been described with reference to preferred embodiments, workers skilled in the art will recognize that changes may be made in form and detail without departing from the spirit and scope of the invention.

The invention claimed is:

1. A method for preparing an inoculated substrate for fermentation comprising the steps:
   i. sterilizing and expanding an initial substrate to obtain a sterile expanded substrate, by charging the initial substrate into a closed pressure chamber and subjecting the substrate to pressure and heat in the presence of steam as an expansion medium and suddenly releasing the pressure; and
   ii. cooling and inoculating the sterile expanded substrate by contacting the sterile expanded substrate with a cooling medium and an inoculum to obtain a cooled inoculated substrate.

2. The method according to claim 1, wherein the sterilization and/or the expansion step are performed using steam.

3. The method according to claim 1, wherein the sterilization step and the expansion step are performed simultaneously.

4. The method according to claim 1, wherein the cooling medium is water.

5. The method according to claim 4, wherein the water has a temperature below 40° C.

6. The method according to claim 4, wherein the water contains auxiliary agents for improving the fermentation conditions for the micro-organism.

7. The method according to claim 1, wherein the contacting of the sterile expanded substrate with the cooling medium and the inoculum is performed simultaneously.

8. The method according to claim 7, wherein the cooling medium contains the inoculum.

9. The method according to claim 7, wherein the sterile expanded substrate is transferred to a vessel or bag suitable for solid state fermentation prior to contacting the sterile expanded substrate simultaneously with the cooling medium and the inoculum.

10. The method according to claim 1, wherein the sterile expanded substrate is first cooled and then inoculated.

11. The method according to claim 1, wherein an incubation step is performed after inoculating the substrate.

12. The method according to claim 1, wherein the initial substrate, the sterile expanded substrate, and/or the cooled substrate is dried using dry steam before the inoculation step.

13. The method according to claim 1, wherein the initial substrate is introduced into the pressure chamber via a separate process stream from the steam, cooling medium and inoculum.

14. The method according to claim 1, wherein the substrate is rye.

15. The method according to claim 1, wherein the inoculum is a fungus.

16. The method according to claim 4, wherein the water has a temperature below 20° C.

17. The method according to claim 6, wherein the auxiliary agents are acids, bases, sugars, precursors for the final fermentation product, or thermolabile agents.

* * * * *